(12) United States Patent
Hart

(10) Patent No.: US 11,554,660 B2
(45) Date of Patent: *Jan. 17, 2023

(54) MODULAR ELECTRIC WHEEL ASSEMBLY FOR AN ELECTRIC VEHICLE

(71) Applicant: Brendan Hart, Blackburn (AU)

(72) Inventor: Brendan Hart, Blackburn (AU)

( * ) Notice: Subject to any disclaimer, the term of this patent is extended or adjusted under 35 U.S.C. 154(b) by 62 days.

This patent is subject to a terminal disclaimer.

(21) Appl. No.: 17/303,567

(22) Filed: Jun. 2, 2021

(65) Prior Publication Data

US 2021/0284010 A1  Sep. 16, 2021

Related U.S. Application Data

(63) Continuation of application No. 16/324,048, filed as application No. PCT/AU2017/050864 on Aug. 15, 2017, now Pat. No. 11,046,170.

(30) Foreign Application Priority Data

Aug. 16, 2016 (AU) ................................ 2016903269

(51) Int. Cl.
| | |
|---|---|
| *B60K 7/00* | (2006.01) |
| *B60L 7/18* | (2006.01) |
| *B60K 17/356* | (2006.01) |

(52) U.S. Cl.
CPC .............. *B60K 7/0007* (2013.01); *B60K 7/00* (2013.01); *B60L 7/18* (2013.01); *B60K 7/0023* (2013.01); *B60K 17/356* (2013.01); *B60K 2007/0038* (2013.01); *B60K 2007/0092* (2013.01); *B60L 2240/461* (2013.01); *B60L 2240/463* (2013.01); *Y02T 90/16* (2013.01)

(58) Field of Classification Search
CPC ................................. B60K 7/0007; B60L 7/18
See application file for complete search history.

(56) References Cited

U.S. PATENT DOCUMENTS

| | | | | |
|---|---|---|---|---|
| 11,046,170 B2 * | 6/2021 | Hart | ......................... | B60L 7/18 |
| 2011/0288707 A1 * | 11/2011 | Westlake | ............. | B60K 7/0007 |
| | | | | 701/22 |

\* cited by examiner

*Primary Examiner* — James M Dolak
*Assistant Examiner* — James J Triggs
(74) *Attorney, Agent, or Firm* — Innovation Capital Law Group, LLP; Vic Lin

(57) ABSTRACT

A modular electric wheel assembly includes integral/in-built acceleration and braking componentry and/or steering and suspension componentry allowing for the modular application thereof. Each modular wheel assembly may receive drive control data from various sensors (such as accelerator and brake pedal position sensors, steering column rotational offset sensors and the like), vehicle control systems or the like so as to be able to independently drive, brake, steer and/or provide active suspension for the vehicle. The wheel assemblies may communicate with each other across a wheel assembly vehicular network, wherein a master wheel assembly may receive drive control data and control the slave wheel assemblies accordingly. The modular wheel assemblies may further communicate with each other to receive various sensor data, including rotational speed sensor data so as to be able to detect loss of traction events and the like so as to substantially autonomously take remedial traction control action.

20 Claims, 8 Drawing Sheets

MODULAR ELECTRIC WHEEL ASSEMBLY FOR AN ELECTRIC VEHICLE

CROSS-REFERENCE TO RELATED APPLICATIONS

This application is a continuation of U.S. patent application Ser. No. 16/324,048, filed Feb. 7, 2019, the contents of which are herein incorporated by reference.

FIELD OF THE INVENTION

This invention relates generally to electric vehicles. More particularly, this invention relates to a modular electric wheel assembly for an electric vehicle.

SUMMARY OF THE DISCLOSURE

There is provided herein a modular electric wheel assembly advantageously comprising integral/in-built acceleration and braking componentry and, in embodiments, steering and suspension componentry allowing for the modular application thereof.

In this regard, an improved electric vehicle may be provided comprising a plurality of these modular electric wheel assemblies each acting substantially independently but in unison. Each modular wheel assembly may receive drive control data from various sensors (such as accelerator and brake pedal position sensors, steering column rotational offset sensors and the like), vehicle control systems or the like so as to be able to independently drive, brake, steer and/or provide active suspension for the vehicle.

The integral construction of the modular electric wheel assembly avoids unnecessary chassis space encroachment and necessarily attended componentry as may be required by prior art arrangements such as drivetrains, steering columns and the like thereby conferring advantages in space-saving, weight saving, construction simplicity and the like wherein, for example, the vehicle body may be advantageously manufactured from a simpler and more lightweight composite such as from aluminium, carbon fibre or the like by having the drive control componentry integrally located within the modular wheel assemblies themselves.

In embodiments, the wheel assemblies of a vehicle may communicate with each other across a wheel assembly vehicular network which, in embodiments, may take the form of a master/slave arrangement. In accordance with this embodiment, a master wheel assembly may receive the drive control data and control the slave wheel assemblies accordingly. Such control may further be controlled in accordance with a front or rear wheel drive setting, front wheel or all wheel steering for driving or parking respectively and the like.

In embodiments, the modular wheel assemblies may further communicate with each other to receive various sensor data, including rotational speed sensor data so as to be able to detect loss of traction events and the like so as to substantially autonomously take remedial traction control action, such as front wheel acceleration and/or rear wheel braking.

As such, with the foregoing in mind, in accordance with one embodiment, there is provided a modular electric wheel assembly for an electric vehicle comprising: a chassis attachment point; a wheel hub assembly rotatably coupled by bearings about the chassis attachment point; an electromagnetic interface interfacing the chassis attachment point and the wheel hub; an electronic control module operably controlling the electromagnetic interface; and an interface for receiving drive control data comprising at least acceleration and braking drive control data and wherein the electronic control module is configured for controlling the electromagnetic interface for acceleration and braking The wheel hub assembly may comprise a wheel rim having a lateral extent, and wherein the electromagnetic interface and the electronic control module are located entirely within the lateral extent of the wheel rim.

The modular electric wheel assembly may further comprise a fixed portion connected to the chassis attachment point and a seal between the fixed portion and the wheel hub assembly defining a compartment and wherein the electromagnetic interface and the electronic control module are located within the compartment.

The electromagnetic interface may comprise a plurality of permanent magnets fixed to the wheel hub assembly and a plurality of electromagnets fixed with respect to the chassis attachment point.

The modular electric wheel assembly may further comprise an electromagnetic switching interface interfacing the plurality of electromagnets and the electronic control module, the electromagnetic switching interface configured for drawing power from a power supply for acceleration.

The modular electric wheel assembly may further comprise a regenerative braking interface interfacing the plurality of electromagnets and the electronic control module, the regenerative braking interface may be configured for supply power to the power supply when braking.

The interface may comprise a drive control position sensor interface configured for sensing the drive control data from a setpoint position of at least one of an accelerator and brake pedal.

The interface may comprise a vehicle control interface for receiving the drive control data from a vehicle control system.

The modular electric wheel assembly may further comprise a communication interface and wherein the electronic control module may be configured for forming an electric wheel vehicular communication network with at least one other modular electric wheel assembly.

The electronic control module may be configured for controlling the at least one other modular electric wheel assembly according to the drive control data.

The electronic control module may be configured for controlling at least one of acceleration and braking of the least one other modular electric wheel assembly according to the drive control data.

The at least one other modular electric wheel may comprise at least front and rear located modular electric wheels and wherein the electronic control module may be configured for controlling acceleration of either one or both of the front and rear located modular electric wheels in accordance with a drive control setting representing at least a front and rear wheel drive setting.

The modular electric wheel assembly may further comprise a steering actuator operative between the wheel hub assembly and the chassis attachment point configured for steering the wheel hub assembly with respect to the chassis attachment point.

The drive control data further may comprise a steering position setpoint and wherein the electronic control module may be configured for controlling the steering actuator accordingly.

The interface may comprise a drive control position sensor interface configured for sensing the steering column setpoint from a steering column.

The modular electric wheel assembly may further comprise a vehicle control interface for receiving the steering column setpoint from a vehicle control system.

The modular electric wheel assembly may further comprise a communication interface and wherein the electronic control module may be configured for controlling the at least one other modular electric wheel assembly according to the drive control data wherein the at least one other modular electric wheel may comprise at least front and rear located modular electric wheels and wherein the electronic control module may be configured for controlling either or both of the front and rear located modular electric wheels in accordance with a drive action setting representing at least one of parking and driving actions.

The modular electric wheel assembly may further comprise a rotation sensor for sensing the rotation of the wheel hub assembly and the electronic control module may be configured for receiving rotation sensor data from the at least one other modular electric wheel assembly and wherein the electronic control module may be configured for detecting a loss of traction event of one of the at least one other modular electric wheel assembly using the rotation sensor data and wherein the electronic control module may be configured for controlling the at least one other modular electric wheel assembly accordingly.

The at least one other modular electric wheel may comprise at least front and rear located modular electric wheels and wherein the electronic control module may be configured for driving the front wheels.

The at least one other modular electric wheel may comprise at least front and rear located modular electric wheels and wherein the electronic control module may be configured for braking the rear wheels.

The modular electric wheel assembly may further comprise a travelling portion configured for travelling vertically with respect to the chassis attachment point and a suspension actuator operative between the travelling portion and the chassis attachment point.

The interface may comprise a vehicle control interface for receiving the drive control data from a vehicle control system and wherein the drive control data may comprise a suspension setting and wherein the electronic control module may be configured for controlling the suspension actuator in accordance with the suspension setting.

The suspension actuator may comprise a pneumatic actuator.

The modular electric wheel assembly may further comprise a travel limiting cushion located between the suspension actuator and the travelling portion at an upper end thereof.

The modular electric wheel assembly may further comprise an inferior parking arm configured for selectively frictionally engaging an inner surface of the wheel hub assembly when the suspension actuator may be deactivated.

In one embodiment, the electromagnetic interface may act on a rotor and wherein the rotor may act on a stepdown gearing mechanism between the rotor and the wheel hub assembly.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
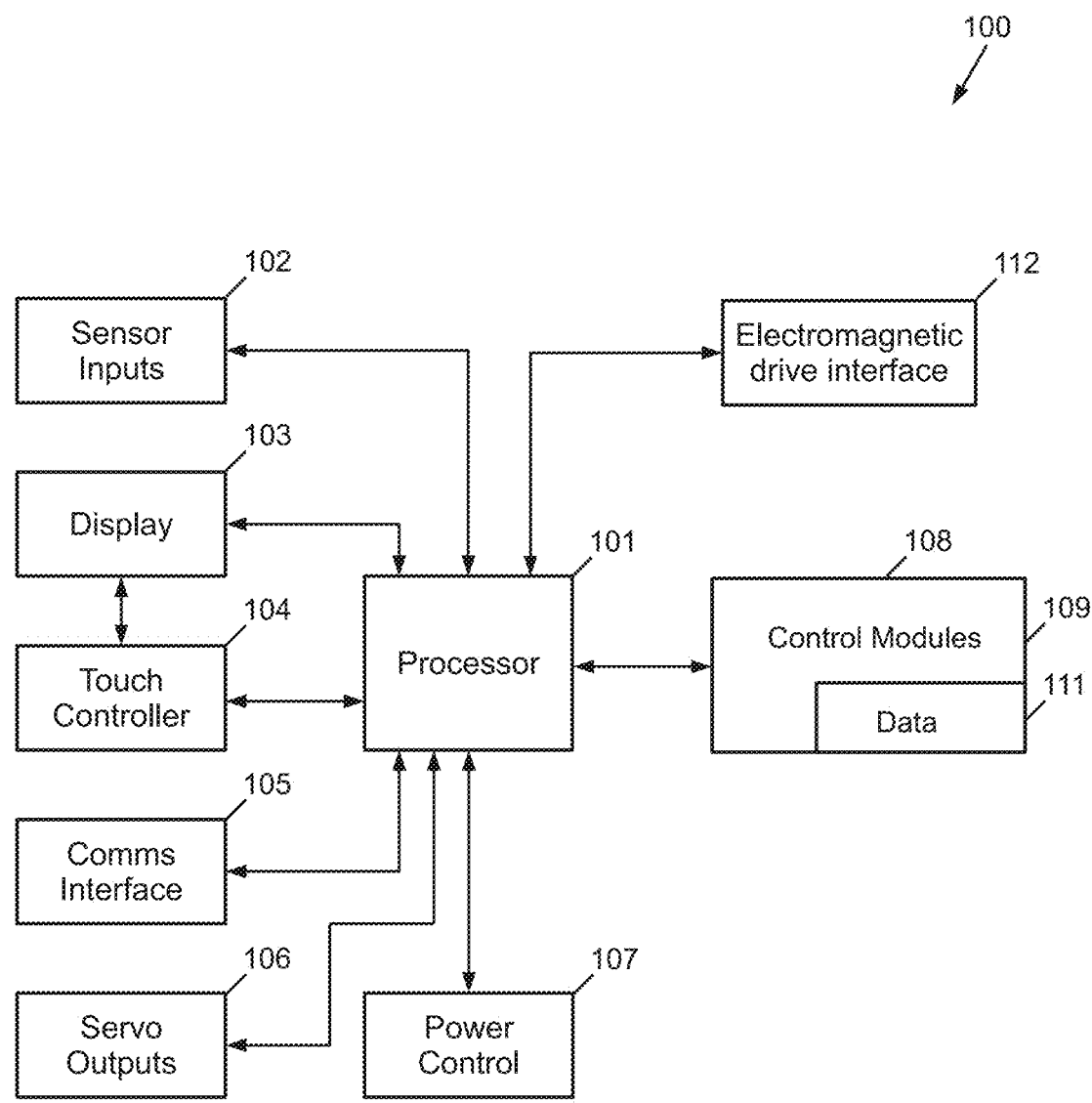
FIG. 1 shows an electronic control module for a modular electric wheel assembly in accordance with an embodiment.

The modular electric wheel assembly 200 comprises a chassis attachment point 507 and a wheel hub assembly 501 rotatably coupled by bearings 502 about the chassis attachment point 507.

The modular electric wheel assembly 200 further comprises an electromagnetic interface interfacing the chassis attachment point 507 and the wheel hub assembly 501.

The electromagnetic interface may comprise an arrangement of electromagnets 202 acting on permanent magnets 201. In the embodiment shown in FIG. 5, the permanent magnets 201 are fixed to the wheel hub assembly 501 so as to rotate therewith in relation to the static electromagnets 202 fixed with respect to the chassis attachment point 507.

The modular electric wheel assembly 200 further comprises an electronic control module 100. The electronic control module 100 operably controls the electromagnetic interface.

FIG. 1 shows a computing device implementation of the electronic control module 100.

In the embodiment shown, the electronic control module 100 comprises a microprocessor 101 for processing digital data.

In operable communication with the processor 101 across a system bus is a memory device 108. The memory device 108 is configured for storing digital data including computer program code. The computer program code may be logically divided into various computer program code control modules 109 implementing the various functionality described herein and acting on associated data 111 stored within the memory device 108. In this regard, the various computer code modules 109 may control various operational aspects of the electric wheel assembly 200 including acceleration, regenerative braking, steering, adaptive suspension, traction control and the like.

As such, during execution, the processor 101 fetches computer program code instructions from the memory device 108 and associated data 111 for interpretation and execution.

The memory device 108 may comprise one or a combination of volatile RAM and nonvolatile ROM memory.

As is also shown, the control module 100 may further comprise the electromagnetic interface 112 in operable communication with the processor 101 across a system bus. As will be described in further detail below, the processor

101 may operably control the electromagnetic interface 112 to control drive, regenerative braking, steering, suspension, traction control and the like.

The processor 101 may further be in operable communication with a plurality of sensor inputs 102 including those described in further detail below with reference to FIG. 2 such as accelerator and brake pedal position sensor inputs, steering column position sensor inputs, speed and traction sensor inputs and the like utilised by the processor 101 for the purposes of controlling the electromagnetic interface 112.

The processor 101 may further be in operable communication with a communication interface 105. In embodiments, the communication device 105 is utilised for communication with other electric wheel assemblies 200 in a vehicle wheel hub network as will be described in further detail below with reference to FIG. 3. In further embodiments, the communication interface 105 may be in operable communication with other subsystems, such as vehicle control subsystems and the like.

The processor 101 may further comprise one or more actuator outputs 106 for the control of actuators such as steering, dynamic suspension actuators and the like.

In embodiments, the processor 101 may be in operable communication with a digital display device 103 for the purposes of displaying digital information. In embodiments, the display device 103 may take the form of an LCD display device or the like.

A touch controller 104 may be overlaid the digital display device 103 so as to be able to receive haptic user interface gestures for interaction therewith. In alternative embodiments, the processor 101 may display digital information via the vehicle control system by communication via the communications interface 105.

Figure 2:
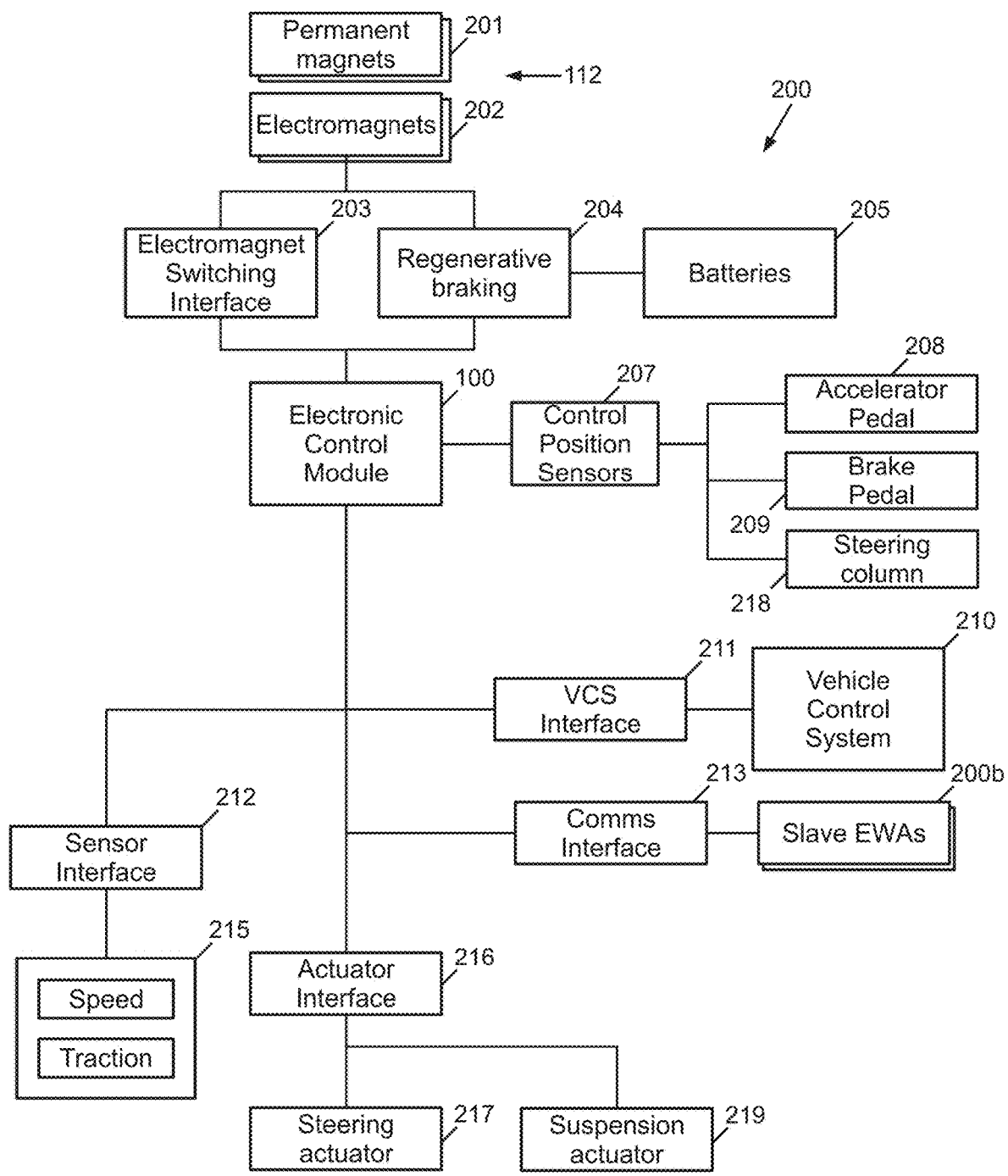
FIG. 2 shows a modular electric wheel assembly system in accordance with an embodiment.

FIG. 2 shows a functional schematic of the electric wheel hub assembly 200.

As can be seen, the wheel hub assembly 200 comprises the electronic control module 100 operably controlling the electromagnetic interface 112. As is shown in the embodiment, the electromagnetic interface 112 may comprise one or more electromagnets 202 acting on appropriately placed permanent magnets 201.

In embodiments, the electronic control module 100 may control the electromagnetic interface 112 for drive and may therefore comprise an electromagnetic switching interface 203 to selectively switch power to the electromagnets 202 from a battery power supply 205, capacitive storage power supply or the like.

In embodiments, the electronic control module 100 may further control the electromagnetic interface 112 for braking and may therefore comprise a regenerative braking interface 204 for such. In embodiment, the regenerative braking interface 204 may regenerate power for replenishing the battery (or capacitive) power supply 205. Alternatively, power may be dumped to a load resistor.

In embodiments, the wheel hub assembly 200 may comprise drive control position sensors 207 in operable communication with the electronic control module 100.

In embodiments, the drive control position sensors 207 are configured for sensing drive control data/information including those received from accelerator panels 208, brake panels 209, steering columns 218 and the like. As such, in accordance with acceleration and braking drive control sensor data received via the drive control position sensors 207, the electronic control module 100 may control the electromagnetic interface 112 for the purposes of respective acceleration and braking.

As is further shown in FIG. 2, the electronic control module 100 may output control instructions to an actuator interface 216 for controlling various operational actuators. In embodiments, the actuator interface 216 may comprise a steering actuator 217 configured for steering the wheel hub assembly 501 with respect to the chassis attachment point 507. As such, in the embodiment wherein the drive control position sensor 207 sensors a change in steering column 218 position, the electronic control module 100 may control the steering actuators 217 accordingly.

Furthermore, the electronic control module 100 may control a suspension actuator 219 for the purposes of controlling active suspension of the wheel hub assembly 200.

It should be noted that the term "actuator" described herein should be construed broadly as any type of appropriate actuator including motorised and pneumatic actuators.

In embodiments, the electronic control module 100 may interface with a vehicle control system 210 via a vehicle control system interface 211. In this regard, the electronic control module 100 may read various data from the vehicle control system 210 including drive control data (which may, in embodiments, negate the need for drive control position sensors 207). Additionally, the electronic control module 100 may output various data to the vehicle control system 210.

In embodiments, the electronic control module 100 may communicate with other modular electric wheel hub assemblies 200 via a communication interface 213. In this manner, a plurality of electric wheel assemblies 200 may act substantially autonomously in unison in a peer-to-peer, master/slave or the like vehicular network. For the latter, control may be transferred between wheel assemblies 200 wherein, for example, a slave wheel hub assembly 200 may assume control as a master wheel hub assembly 200 when detecting a loss of traction was to be able to control the other wheel hub assemblies 200 as slaves accordingly so as to implement traction control.

In further embodiments, electronic control module 100 may comprise a sensor interface 212 for receiving sensor data from one or more operational sensors 215 including for the purposes of sensing rotational speed, traction and the like of the wheel hub assembly 501. Such sensor data may be utilised for the purposes of speed, traction control and the like.

Figure 3:
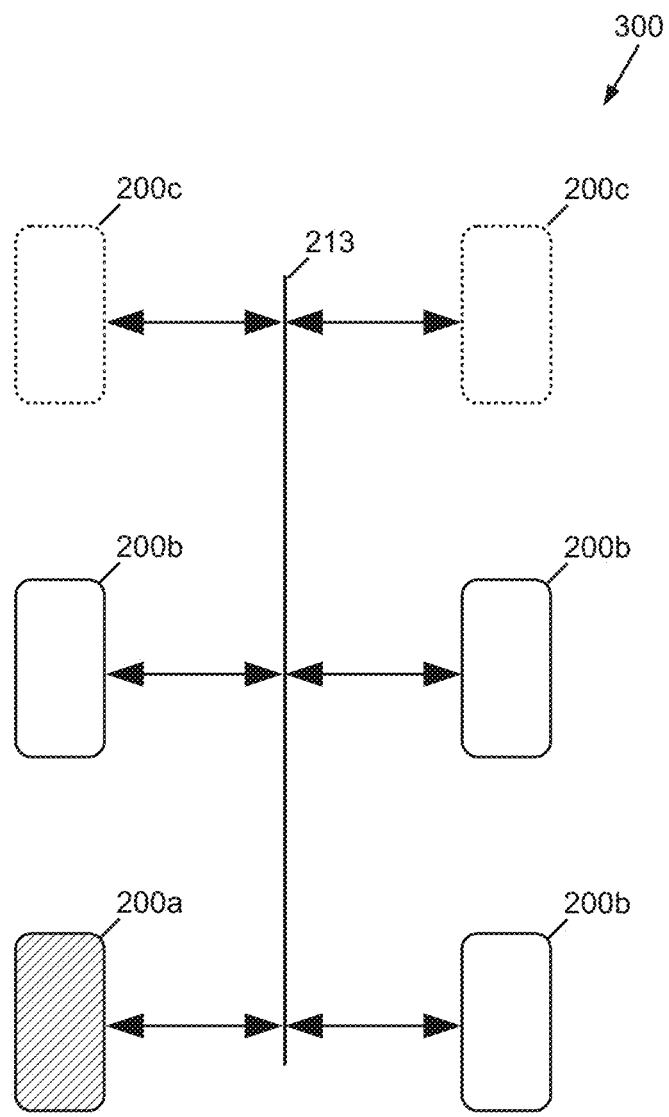
FIG. 3 shows an electric wheel vehicular network in accordance with an embodiment.

FIG. 3 shows an exemplary vehicular network comprising a plurality of electric wheel hub assemblies 200. As can be seen, the network 300 comprises a plurality of wheel hub assemblies 200 in operable communication with each other across a communication interface 213. Various communication interfaces 213 may be utilised within the purposive scope of the present embodiments, including wired interfaces such as CAN bus interfaces, optical interfaces, wireless network interfaces and the like.

As such, each wheel hub assembly 200 (and specifically each respective electronic control module 100) may act substantially autonomously in a peer-to-peer, master/slave operational mode or the like.

Specifically, as can be seen in the embodiment shown, one wheel hub assembly 200a may assume the role of master so as to be able to control a plurality of wheel hub assembly slaves 200b.

As such, the master wheel assembly 200a may, for example, receive drive control sensor data via the drive control position sensors 207 for at least one of acceleration, braking, steering and the like so as to be able to provide operational control instructions to the slave wheel assembly assemblies 200b.

For example, when detecting a position set point change of the accelerator panel 208 indicative of acceleration, the master wheel assembly 200a may additionally control the slave wheel assemblies 200b to additionally provide drive.

In embodiments, when providing such drive, the master wheel assembly 200a may control a subset of the slave wheel assemblies 200b so as to be able to, for example, provide front wheel or all wheel drive.

Similarly, when receiving braking drive control data via the sensor interface 207 (or the vehicle control system interface 211), the master wheel assembly 200a may similarly control the slave wheel assemblies 200b via the communication interface 213 to provide braking, including regenerative braking.

Yet further, when detecting a steering column 218 position set point change by the drive control position sensor 207, the electronic control module 100 of the master wheel assembly 200a may instruct the slave wheel assembly assemblies 200b via the communication interface 102 to control the respective steering actuators 217 accordingly. Similarly, in embodiments, such steering may be front wheel steering only such as when utilised when driving or alternatively all wheel steering when parking, for example.

In embodiments, each wheel assembly 200 may further receive sensor data from the sensor interfaces 212 of the other wheel assemblies 200. In one embodiment, the sensor data may represent rotational speed such that the wheel assemblies 200 may detect loss of traction, skidding or the like of another wheel assembly 200 so as to be able to take remedial action. For example, when detecting skidding, a forward located wheel assembly 200 may increase power by accelerating and rearward located wheel assemblies 200 may implement braking so as to attempt to correct the vehicle. Alternatively, and as alluded to above, a wheel assembly 200 may detect a driving anomaly itself such as loss of traction so as to be able to, for example, takeover as master so as to be able to instruct other wheel assemblies 200 to take remedial action.

Figure 4:
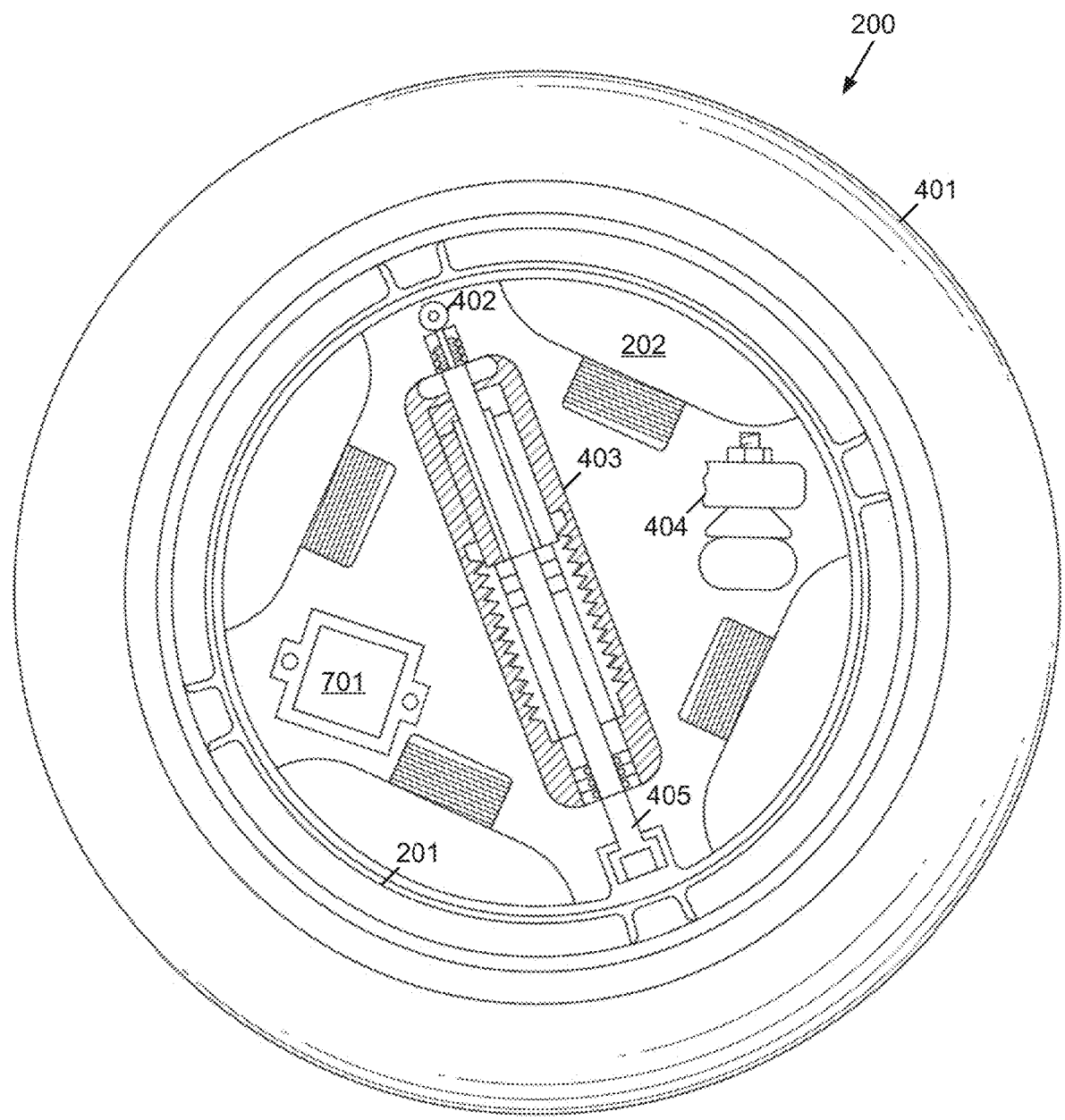
FIG. 4 shows a side elevation cross-sectional view of a modular electric wheel assembly in accordance with an embodiment.

FIG. 4 shows a side elevation view of the wheel hub assembly 200 in accordance with an embodiment. As can be seen, the wheel assembly 200 comprises a rubberised tyre 401 operably attached to the wheel hub assembly 501.

Furthermore, there is shown the electromagnetic interface 112 comprising a plurality of electromagnets 202 acting on respective permanent magnets 201. In the embodiments shown, four electromagnets 202 are shown acting on a respective four permanent magnets 201. However, should be noted that in embodiments, differing numbers and arrangements may be utilised within the purposive scope of the embodiments provided herein.

Figure 8:
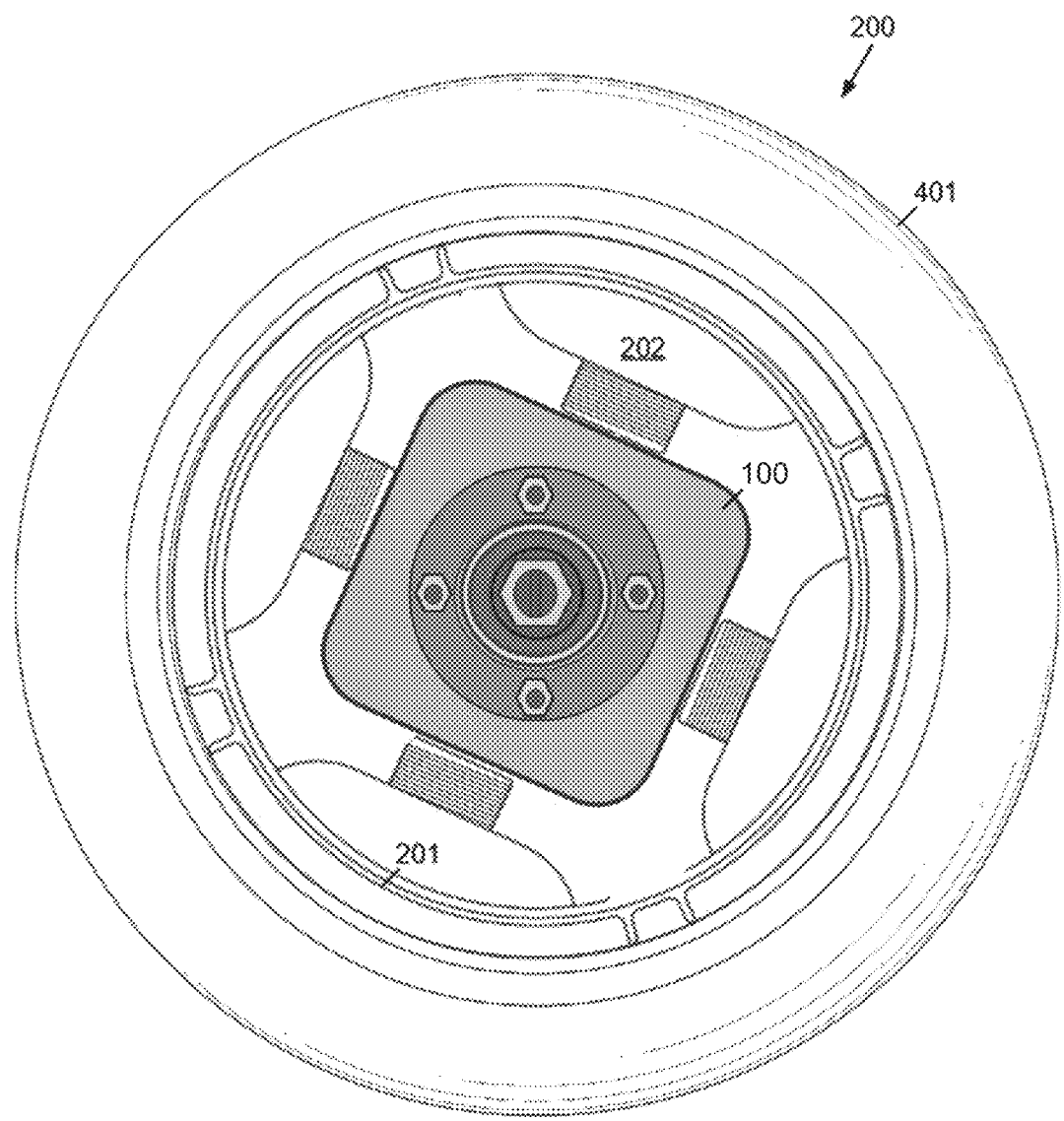
FIG. 8 shows an outside side elevation view of the modular electric wheel assembly in accordance with an embodiment.

As is also shown, the wheel hub assembly 2 may comprise a data connector 701 for the electronic control module 100. FIG. 8 illustrates the electronic control module 100 suitably robustly housed and fastened within the wheel hub 200.

Also shown is an active suspension piston 403 which may be operably controlled via the suspension actuator interface 216. In embodiments, the active suspension piston 403 may be pneumatically controlled and therefore comprise an air inlet 402 operably controlled by the suspension actuator interface 216 to appropriately pressurise the piston 403.

There is also shown a steering rod 405 acting between the chassis attachment point 507 and the wheel hub assembly 501 to control the steering thereof. As alluded to above, the steering rod 405 may be controlled by the steering actuator 217.

The wheel assembly 200 as shown in FIG. 4 may further comprise an alternative steering actuator attachment point 404.

Figure 5:
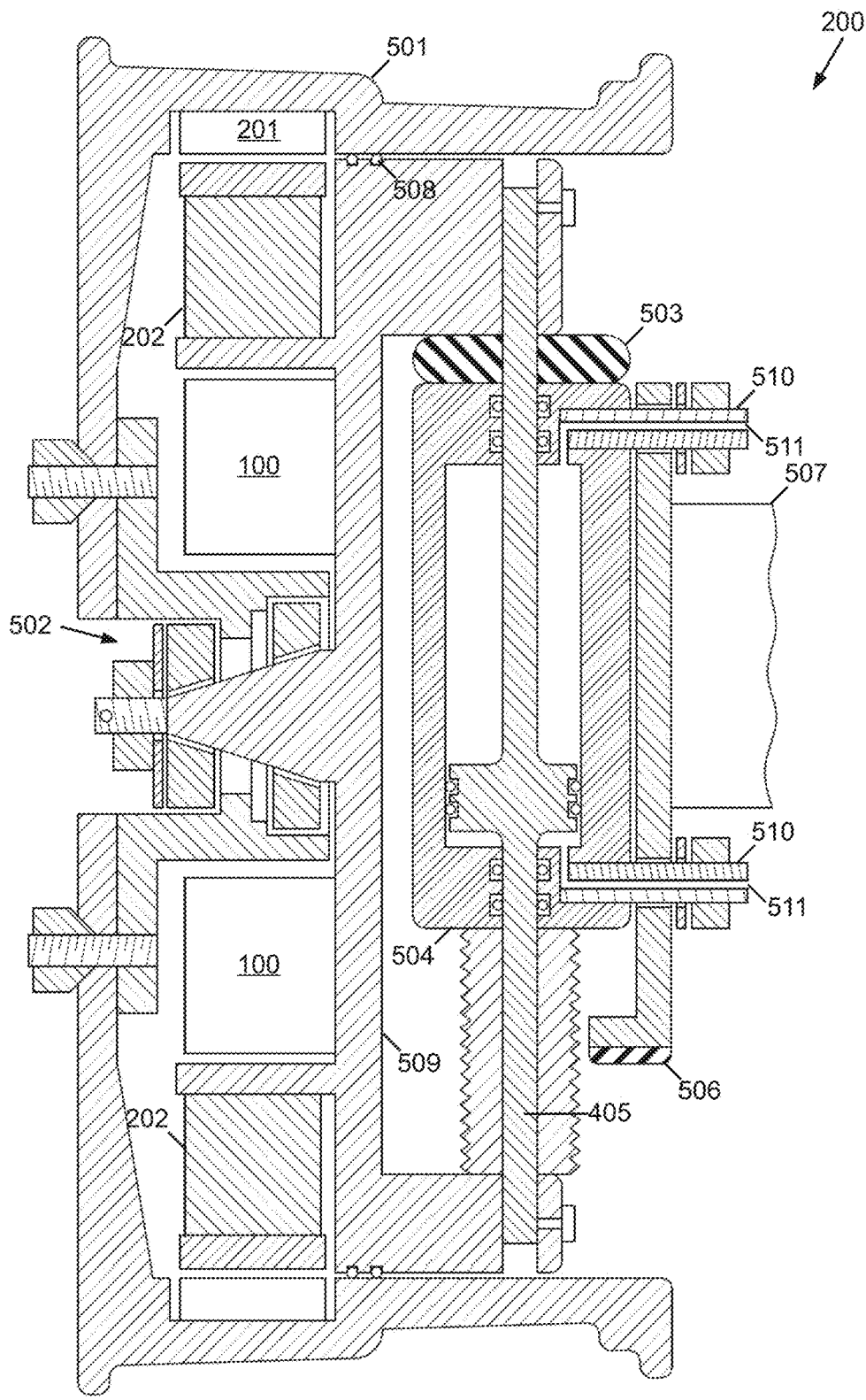
FIG. 5 shows a front elevation cross-sectional view of a modular electric wheel assembly in accordance with an embodiment.

Turning now to FIG. 5, there is shown a side elevation cross-sectional view of the wheel assembly 200.

As can be seen, and as alluded to above, the wheel assembly 200 comprises the fixed chassis attachment point 507 about which each wheel hub assembly 501 rotates on bearings 502. The wheel hub assembly 501 may comprise various constituent componentry including a wheel rim, inner hub and the like.

As can be seen from the embodiment provided, all or most of the constituent componentry of the wheel hub assembly 2 resides within the lateral extent of the wheel rim thereby providing a compact standalone wheel assembly 200 negating chassis space intrusion as do prior art arrangements.

Specifically, such a compact configurations of the wheel assembly 200 may comprise drive, braking and/or steering componentry without requiring chassis space encroaching drive trains, steering columns and the like as do prior art arrangements.

As is also shown, the electromagnetic interface comprises the plurality static electromagnets 202 fixed with respect to the chassis attachment point 507 and acting on permanent magnets 201 rotating with the wheel assembly 501.

In the embodiment shown, the electromagnetic interface 112 act directly on the wheel hub assembly 501. However, in embodiments, the electromagnetic interface 112 may interface the wheel hub 501 via a gearing mechanism wherein, for example, the electromagnetic interface 112 acts on an intermediate relatively higher rotation velocity rotor and wherein the rotor acts on a stepdown gearing mechanism between the rotor and the wheel hub assembly 501. Such an arrangement allows for increased torque as opposed to the electromagnetic interface acting directly on the wheel hub assembly 501.

In embodiments, a seal 508 may interface the wheel hub assembly 501 and a fixed portion of the assembly 200 so as to compartmentalise the electronic control module 100, electromagnets 202 and the like including from dust and fluid ingress.

As is also shown in FIG. 5, the wheel hub assembly 200 may comprise the active suspension piston 504 interfacing between the chassis attachment point 507 and an intermediate travelling portion 509 of the wheel assembly 200. As such, the intermediate travelling portion 509 is able to travel vertically with respect to the chassis attachment point 507 under action of the active suspension piston 504.

A travel limitation cushion 503 may interface the active suspension piston 504 and the intermediate static portion 509 at an upper extent thereof.

Furthermore, the wheel assembly 200 or chassis connection 507 may comprise an inferior parking arm 506 comprising a frictionally engaging head which frictionally engages against the inner surface of the wheel rim when the active suspension piston 504 is depressurised such as when parked.

As is further shown in FIG. 5, the wheel assembly 200 may comprise the steering rod 405 configured to control the steering of the wheel hub assembly 501 with respect to the chassis attachment point 507.

FIG. 5 further shows wheel assembly 200 comprising mountings 510 which, in embodiments, may comprise injection ports 511 for pressurising either side of the piston 504 head.

Figure 7:
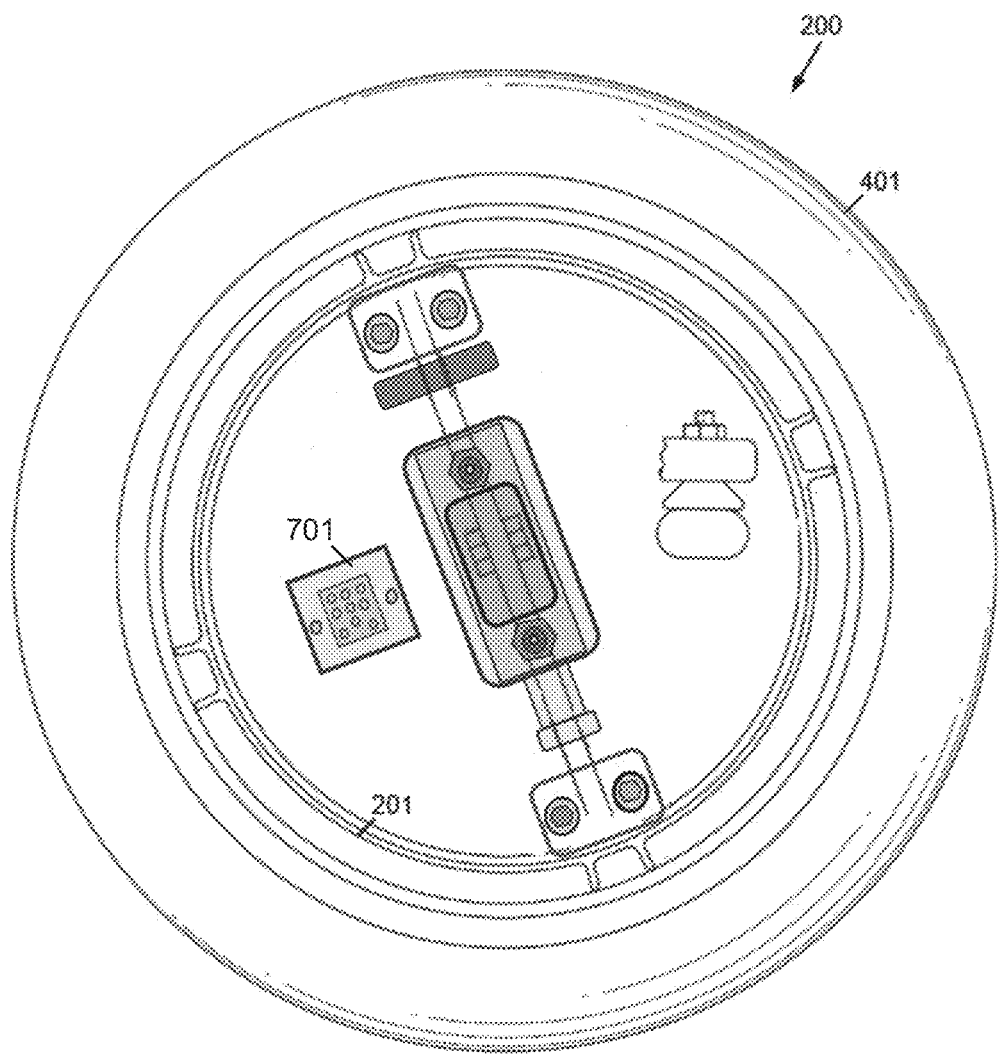
FIG. 7 shows an inside side elevation view of the modular electric wheel assembly in accordance with an embodiment.

The embodiment shown in FIG. 7 shows an inside view of the wheel assembly 200 illustrating a wiring loom connection point 701 for the electronic control module 100 in accordance with an embodiment.

Furthermore, the embodiment in FIG. 8 shows an outside view of the wheel assembly 200 showing an exemplary placement of the electronic control module 100 inward of each of the electromagnets 202.

Having described the above technical componentry of the electrical wheel hub assembly 200, there will now be described various exemplary operational embodiments primarily for illustrative purposes. It should be noted that these exemplary embodiments are illustrative only and that no technical limitation should necessarily be imputed to all embodiments accordingly.

In accordance with these exemplary embodiments, a vehicle may be provided with a plurality of wheel hub assemblies 200, such as a passenger vehicle comprising four wheel hub assemblies 200 or a truck semitrailer comprising more than four wheel assemblies 200.

As alluded to above, in distinction to prior art vehicles, the compact electric wheel hub assembly comprises input componentry for at least one of drive, braking, steering and suspension which the need for chassis space intruding driveshafts, steering columns and the like. As such, the utilisation of the electric wheel hub assembly 200 according to the embodiments provided herein frees space within the vehicular chassis which may allow for space-saving, weight saving and other advantages in certain embodiments.

In a preferred embodiment, the wheel assembly 200 is envisaged for standalone use application in that the wheel assembly 200 provides all of the driving and or (regenerative) braking forces required by the vehicle (including via the stepdown gear arrangement between an intermediate rotor and the wheel assembly as alluded to above). However, in embodiments, the wheel hub assembly 200 may be utilise assistively to complement an existing driveshaft, steering column or braking arrangement so as to enhance drive, braking and/or steering.

In an embodiment, and as alluded to above, one of the wheel assembly assemblies 200 may be configured as a master wheel assembly 200*a*. As such, in use, the master wheel assembly 200*a* is configured for receiving drive controls including acceleration, braking and/or steering drive controls including via the drive control position sensor 207 or the vehicle control system interface 211. As also alluded to above, control may be passed between assemblies in certain situations.

As such, having received such driving control instructions, the master wheel assembly 200*a* is configured for controlling itself and other slave wheel assembly assemblies 200*b* accordingly across the communications interface 213.

For example, when accelerating, the master wheel assembly 200*a* may control the electromagnetic interface 112 both of itself and other slave wheel assembly assemblies 200*b* to provide drive. In embodiments, the master wheel assembly 200*a* may be configured in front wheel or all wheel drive mode (such as by way of configuration setting received via the vehicle control interface 211) so as to be able to control all or a subset of the slave wheel assembly assemblies 200*b*.

Similarly, the master wheel assembly 200*a* may implement braking, including regenerative braking and steering in accordance with wheel control instructions received via the drive control position sensors 207 or via the vehicle control system interface 211.

In embodiments, the master wheel assembly 200*a* may sense rotational speed of the wheel assembly 501 so as to be able to control the electromagnetic interface 211 in accordance with a speed setpoint.

In embodiments, the master wheel assembly 200*a* may monitor the rotational speeds of all of the slave wheel assemblies 200*b* or the traction thereof via the appropriate sensors 215 so as to be able to detect loss of traction, skid events and the like.

As such, for example, when detecting a skid, the master wheel assembly 200*a* may control itself and the slave wheel assembly assemblies 200*b* to, for example, provide front wheel acceleration and rear wheel braking.

Figure 6:
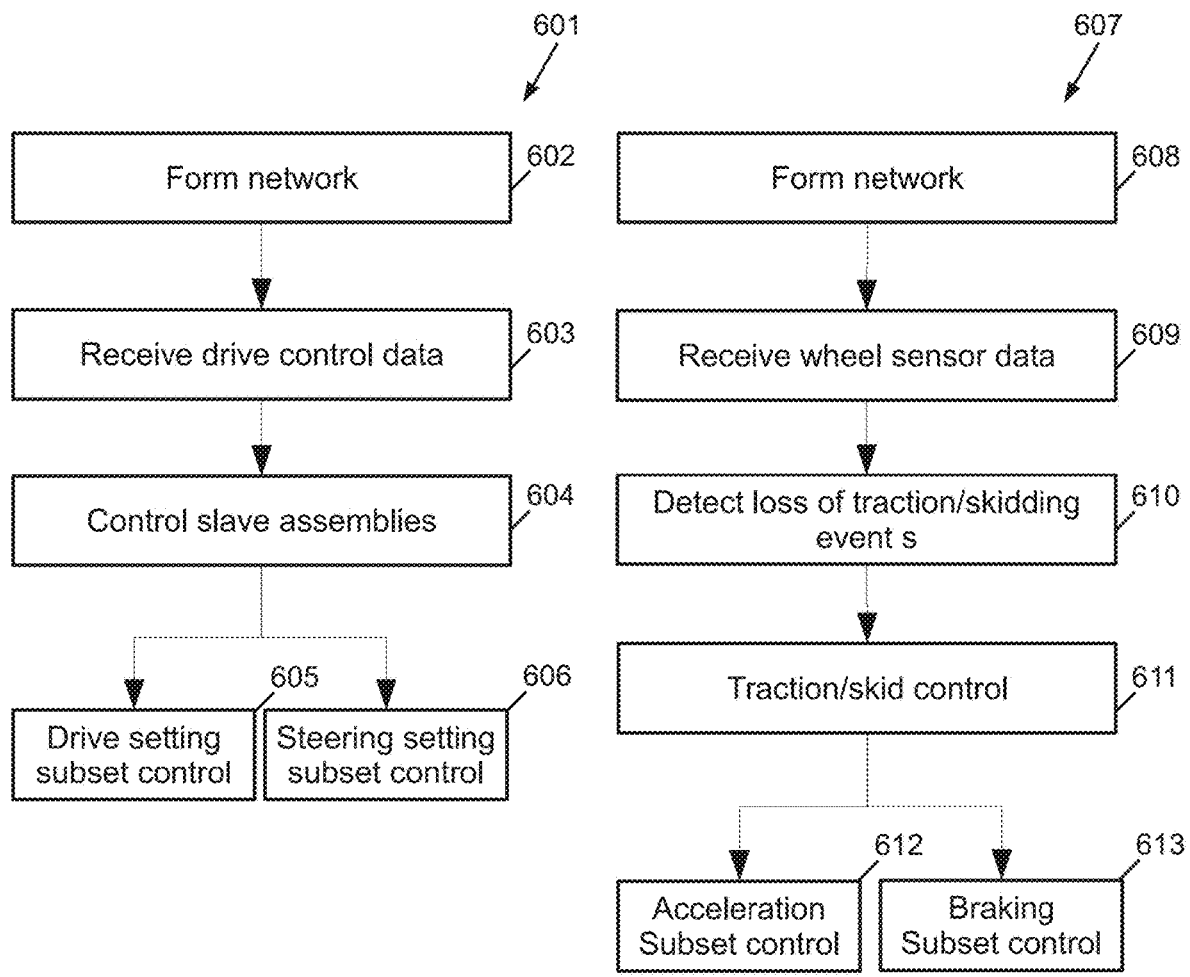
FIG. 6 shows exemplary electric wheel vehicular network control in accordance with embodiments.

FIG. 6 shows exemplary electrical wheel vehicular network control methodologies.

Specifically, there is shown a first methodology 601 wherein the wheel assemblies 200 are arranged in a master slave arrangement. As such, the methodology 601 may comprise the formation of a network 602 which may be set once during manufacture or alternatively dynamically upon power up.

During network formation 602, one of the wheel assemblies 200 would be designated as the master 200*a* so as to be able to control the other slave wheel assemblies 200*b*. Then, the method comprises the master wheel assembly 200*a* receiving drive control data 603 via the control position sensors 207 or the vehicle control system interface 211.

Such drive control data may represent various drive control such as acceleration, braking, steering, suspension settings and the like.

As such, having received the drive control data, the master wheel assembly 200*a* may control both itself and also control 604 the other slave wheel assemblies 200*b*.

For example, for acceleration, the master wheel assembly 200*a* would control the electromagnetic interface 112 accelerator itself and also provide control instructions via the communication interface 213 similarly cause the other slave wheel assemblies 200*b* to similarly accelerate.

As alluded to above, such control 604 may be in accordance with a drive control setting subset control 605 such as a drive control setting representing front wheel drive only or all wheel drive control settings. For example, where the wheel assemblies 200 comprises frontward and rearward wheel assemblies 200, a front wheel drive only setting would cause the master wheel assembly 200*a* only to cause the frontward located wheel assemblies 200 to accelerate.

In a similar manner, steering, braking, and suspension may be controlled in such a master slave arrangement.

Similarly, differing types of steering control may be implemented according to steering setting subset control 606 wherein only front located assemblies 200 are controlled for steering when driving but all wheel assemblies 200 are controlled for parking for tighter control.

Methodology 607 relates to network control wherein the wheel assemblies 200 receive data from each other so as to detect drive events such as skidding, loss of traction and the like.

In a similar manner, the methodology 607 comprises the formation of a network 608 which need not necessarily be a master slave network and could alternatively be a peer-to-peer network.

Then, at step 609, each wheel assembly 200 receives wheel sensor data from each of the other wheel assemblies 200. Such sensor data may represent rotational speed.

As such, the utilisation of the rotational speed may be utilised by the other wheel assemblies 200 to detect loss of traction, skidding or the like.

For example, where all the wheel assemblies 200 report the same rotational speed except for one wheel assembly 200 reporting a higher or lower rotational speed, the wheel assemblies 200 may detect loss of transaction or skidding 610 of that wheel assembly 200 so as to be able to take remedial action such as by way of traction or skid control 611.

Traction or skid control 611 may comprise subset assembly control such as wherein, for example, front wheel acceleration subset control 612 or rear wheel braking subset control 613.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A modular electric wheel assembly for an electric vehicle comprising:
   a chassis attachment point;
   a wheel hub assembly rotatably coupled by bearings about the chassis attachment point;
   an electromagnetic interface interfacing the chassis attachment point and the wheel hub;
   an electronic control module integrated into the modular electric wheel assembly, the electronic control module operably controlling the electromagnetic interface; and
   an interface for receiving drive control data comprising at least acceleration and braking drive control data and wherein the electronic control module is configured for controlling the electromagnetic interface for acceleration and braking, wherein
   the electromagnetic interface comprises a plurality of permanent magnets fixed to the wheel hub assembly and a plurality of electromagnets fixed with respect to the chassis attachment point.

2. The modular electric wheel assembly as claimed in claim 1, wherein the wheel hub assembly comprises a wheel rim having a lateral extent, and wherein the electromagnetic interface and the electronic control module are located entirely within the lateral extent of the wheel rim.

3. The modular electric wheel assembly as claimed in claim 1, further comprising an electromagnetic switching interface interfacing the plurality of electromagnets and the electronic control module, the electromagnetic switching interface configured for drawing power from a power supply for acceleration.

4. The modular electric wheel assembly as claimed in claim 1, further comprising a regenerative braking interface interfacing the plurality of electromagnets and the electronic control module, the regenerative braking interface configured for supply power to the power supply when braking.

5. The modular electric wheel assembly as claimed in claim 1, wherein the interface comprises a drive control position sensor interface configured for sensing the drive control data from a setpoint position of at least one of an accelerator and brake pedal.

6. The modular electric wheel assembly as claimed in claim 1, wherein the interface comprises a vehicle control interface for receiving the drive control data from a vehicle control system.

7. The modular electric wheel assembly as claimed in claim 1, further comprising a communication interface and wherein the electronic control module is configured for forming an electric wheel vehicular communication network with at least one other modular electric wheel assembly.

8. The modular electric wheel assembly as claimed in claim 7, wherein the electronic control module is configured for controlling the at least one other modular electric wheel assembly according to the drive control data.

9. The modular electric wheel assembly as claimed in claim 8, wherein the electronic control module is configured for controlling at least one of acceleration and braking of the least one other modular electric wheel assembly according to the drive control data.

10. The modular electric wheel assembly as claimed in claim 1, further comprising a steering actuator operative between the wheel hub assembly and the chassis attachment point configured for steering the wheel hub assembly with respect to the chassis attachment point.

11. The modular electric wheel assembly as claimed in claim 10, wherein the drive control data further comprises a steering position setpoint and wherein the electronic control module is configured for controlling the steering actuator accordingly.

12. The modular electric wheel assembly as claimed in claim 7, further comprising a communication interface and wherein the electronic control module is configured for controlling the at least one other modular electric wheel assembly according to the drive control data wherein the at least one other modular electric wheel comprises at least front and rear located modular electric wheels and wherein the electronic control module is configured for controlling either or both of the front and rear located modular electric wheels in accordance with a drive action setting representing at least one of parking and driving actions.

13. The modular electric wheel assembly as claimed in claim 7, further comprising a rotation sensor for sensing the rotation of the wheel hub assembly and the electronic control module is configured for receiving rotation sensor data from the at least one other modular electric wheel assembly and wherein the electronic control module is configured for detecting a loss of traction event of one of the at least one other modular electric wheel assembly using the rotation sensor data and wherein the electronic control module is configured for controlling the at least one other modular electric wheel assembly accordingly.

14. The modular electric wheel assembly as claimed in claim 1, further comprising a travelling portion configured for travelling vertically with respect to the chassis attachment point and a suspension actuator operative between the travelling portion and the chassis attachment point.

15. The modular electric wheel assembly as claimed in claim 14, wherein the interface comprises a vehicle control interface for receiving the drive control data from a vehicle control system and wherein the drive control data comprises a suspension setting and wherein the electronic control module is configured for controlling the suspension actuator in accordance with the suspension setting.

16. The modular electric wheel assembly as claimed in claim 14, wherein the suspension actuator comprises a pneumatic actuator.

17. The modular electric wheel assembly as claimed in claim 14, further comprising a travel limiting cushion located between the suspension actuator and the travelling portion at an upper end of the suspension actuator.

18. The modular electric wheel assembly as claimed in claim 14, further comprising an inferior parking arm configured for selectively frictionally engaging an inner surface of the wheel hub assembly when the suspension actuator is deactivated.

19. A modular electric wheel assembly for an electric vehicle comprising:
- a chassis attachment point;
- a wheel hub assembly rotatably coupled by bearings about the chassis attachment point;
- an electromagnetic interface interfacing the chassis attachment point and the wheel hub;
- an electronic control module integrated into the modular electric wheel assembly, the electronic control module operably controlling the electromagnetic interface; and
- an interface for receiving drive control data comprising at least acceleration and braking drive control data and wherein the electronic control module is configured for controlling the electromagnetic interface for acceleration and braking, wherein the electromagnetic interface acts on a rotor and wherein the rotor acts on a stepdown gearing mechanism between the rotor and the wheel hub assembly.

20. A modular electric wheel assembly for an electric vehicle comprising:
- a chassis attachment point;
- a wheel hub assembly rotatably coupled by bearings about the chassis attachment point;
- an electromagnetic interface interfacing the chassis attachment point and the wheel hub;
- an electronic control module integrated into the modular electric wheel assembly, the electronic control module operably controlling the electromagnetic interface;
- an interface for receiving drive control data comprising at least acceleration and braking drive control data and wherein the electronic control module is configured for controlling the electromagnetic interface for acceleration and braking; and
- a steering actuator operative between the wheel hub assembly and the chassis attachment point configured for steering the wheel hub assembly with respect to the chassis attachment point.

* * * * *